Feb. 23, 1937. W. H. MYERS 2,071,864
COLLAPSIBLE CORE AND METHOD OF MAKING AND USING THE SAME
Filed Nov. 24, 1934  2 Sheets—Sheet 1
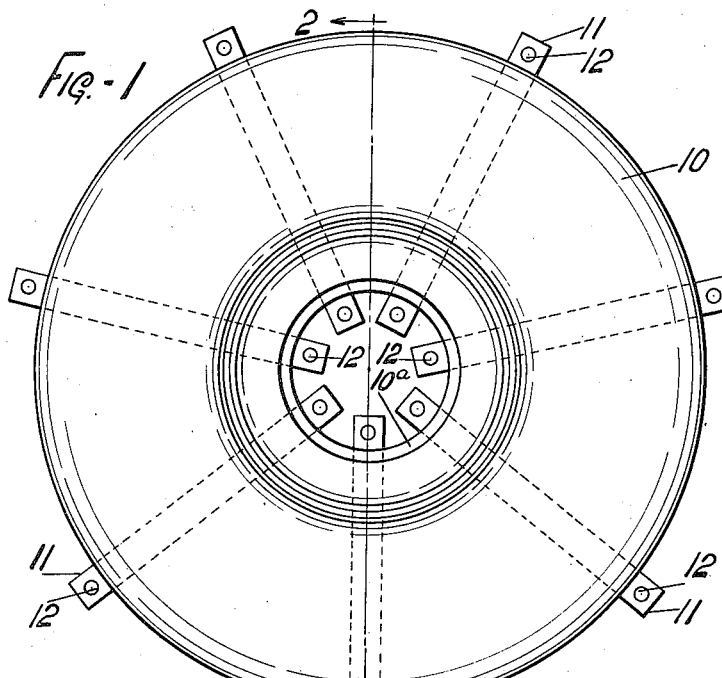
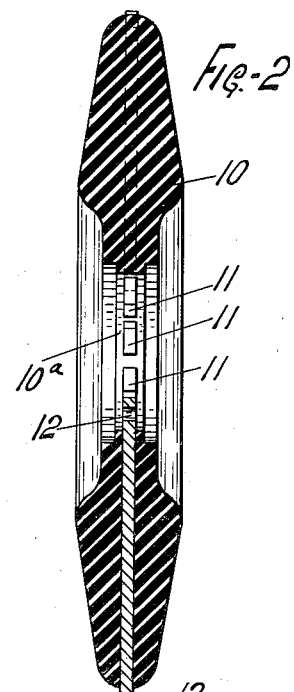
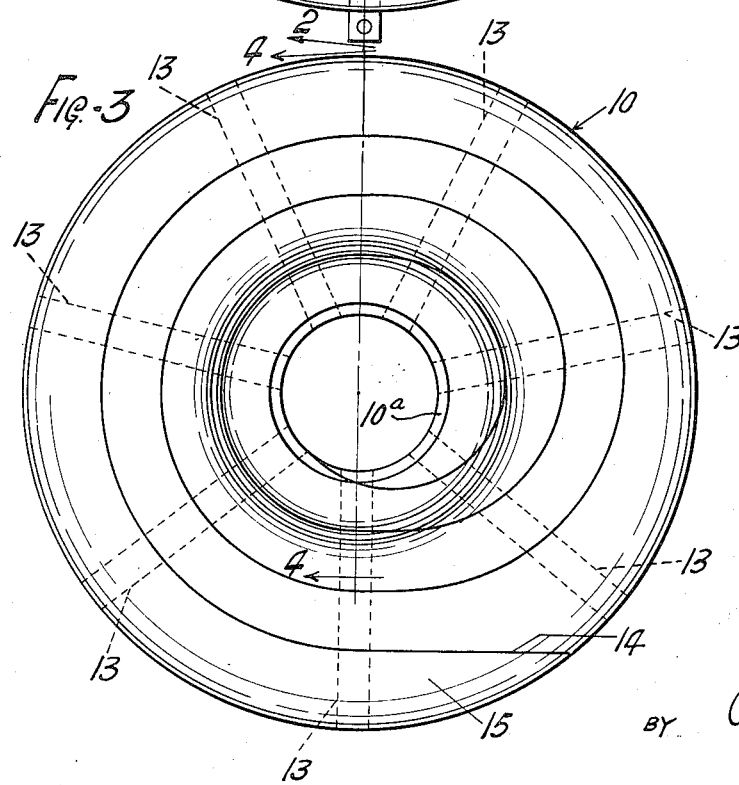
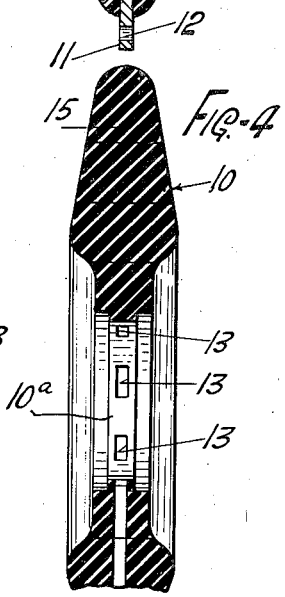
INVENTOR
WILLIAM H. MYERS
BY Albert L. Ely
ATTORNEY Feb. 23, 1937. W. H. MYERS 2,071,864
COLLAPSIBLE CORE AND METHOD OF MAKING AND USING THE SAME
Filed Nov. 24, 1934 2 Sheets-Sheet 2
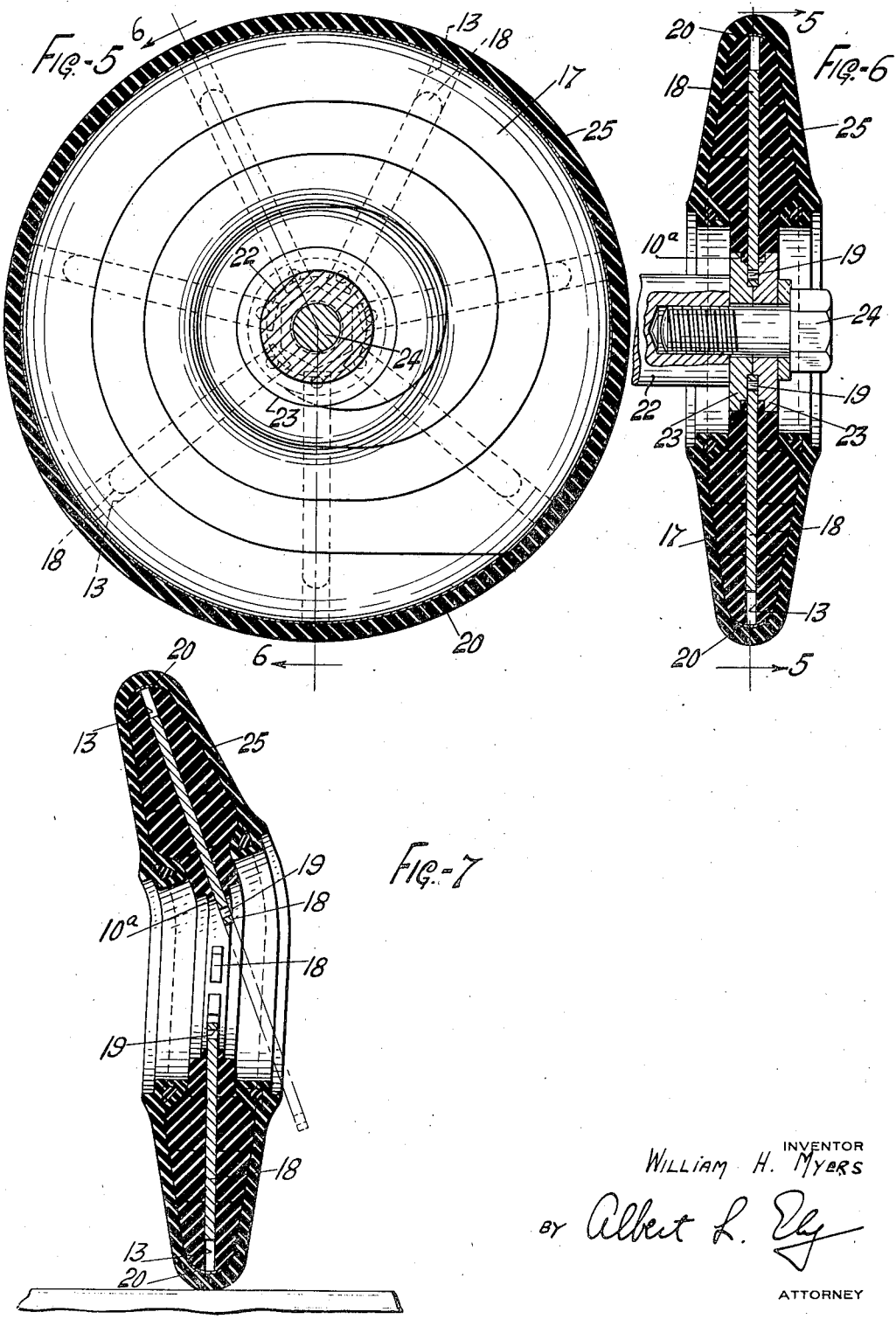
INVENTOR
WILLIAM H. MYERS
BY Albert L. Ely
ATTORNEY Patented Feb. 23, 1937

2,071,864

UNITED STATES PATENT OFFICE 2,071,864

COLLAPSIBLE CORE AND METHOD OF MAKING AND USING THE SAME

William H. Myers, Cuyahoga Falls, Ohio, assignor to The Firestone Tire & Rubber Company, Akron, Ohio, a corporation of Ohio Application November 24, 1934, Serial No. 754,582

16 Claims. (Cl. 154—9.4)

This invention relates to collapsible cores for the building of pneumatic tire casings, and to methods of making and using said cores.

The invention is of primary utility in its application to collapsible cores for the manufacture of pneumatic tire casings of relatively small bead diameter as compared to the outside diameter of the tire, for example, airplane tires, such tires being of such construction and proportion that collapsible cores such as are used in the manufacture of ordinary vehicle tires cannot be extracted therefrom.

The chief objects of the invention are to provide an improved collapsible core for tire building purposes, which core easily may be removed from tires of small bead diameter; to provide an improved method of making collapsible cores of the character mentioned; and to provide a novel method of building tires upon the improved core. Other objects will be manifest as the specification proceeds.

Briefly described, the improved core comprises a molded structure of flexible, vulcanized rubber, and a plurality of radially disposed, metal reinforcing members therein. The rubber structure consists of a single rubber strip that is spirally coiled so as to constitute an annulus or endless ring, the ring having limited deformability when the reinforcing members are mounted therein to permit removal of said reinforcing members through the inner periphery of the ring.

Of the accompanying drawings:

Figure 1 is a front elevation of the improved core in the initial phase of manufacture;

Figure 2 is a section on the line 2—2 thereof;

Figure 3 is a view of the structure shown in Figure 1 after a succeeding phase of manufacture, showing how the structure is cut into a spirally coiled strip;

Figure 4 is a section on the line 4—4 of Figure 3;

Figure 5 is a section on the line 5—5 of Figure 6 showing the improved core in elevation as it appears in operation when mounted upon a rotatable spindle, and a tire built upon said core;

Figure 6 is a section on the line 6—6 of Figure 5; and

Figure 7 is a diametric section through the improved core, and a tire thereon, showing how the core and tire are deformed to permit removal of the reinforcing elements of the core preparatory to the removal of the core from the tire.

Referring to Figures 1 and 2 of the drawings which show the original condition of the improved core, 10 is an annular molded body of resilient vulcanized rubber, and 11, 11 are metal mandrels disposed radially of the same and molded thereinto at the medial plane thereof. Mandrels 11 are herein shown as seven in number, and they project beyond the inner and outer peripheries of rubber structure, said projecting portions being apertured as shown at 12, 12. The apertures 12 may be utilized during the molding of the body 10 for receiving positioning dowels. As shown, the body 10 is substantially ogival shape in section, being designed for the manufacture of streamlined airplane tires having radial height as great as or greater than their bead diameter. A circumferential flange 10a is formed centrally of the inner periphery of the body 10.

The next step in the manufacture of the improved core, shown in Figures 3 and 4, consists in the withdrawal of the mandrels 11 which is accomplished by engaging a suitable pulling tool in apertures 12 in the outer ends of the mandrels, and then pulling the mandrels radially outwardly, the radial spaces or apertures previously occupied by the mandrels being designated 13. Thereafter the body 10 is cut transversely from its outer periphery to its inner periphery along the line 14, said line describing an irregular spiral and converting the annular body 10 into a single strip of material 15 that has less radial thickness at the inner periphery of the core than at the outer periphery thereof. The arrangement provides greater flexibility of the strip 15 at its inner end, and thereby facilitates removal of the strip from a tire subsequently built on the core since the inner end of the strip is required to flex more sharply than the outer end thereof.

The complete core, shown in Figures 5, 6 and 7 and designated 17, includes a plurality of radially disposed, metal reinforcing strips 18, 18 that are mounted in the radial spaces 13 after the body 10 has been spirally cut. The metal strips 18 are inserted in the spaces 13 from the outer ends of the latter and project a determinate distance inwardly beyond the inner periphery of the core, the projecting end portions of the respective strips being apertured at 19. The outer ends of the reinforcing strips 18 are disposed somewhat inwardly from the outer periphery of the core, and the open, outer ends of the spaces 13 may be concealed by a strip of adhesive tape 20 that is wrapped circumferentially about the core, said tape also serving to hold down the outer end of the strip 15.

In the building of a tire upon the core 17, the latter is carried upon a rotatable spindle 22, which may be a part of a tire building machine of known construction (not shown), the core being clamped between a pair of annular plates 23, 23 that engage the inner end portions of the reinforcing members 18 and the inner peripheral flange 10a of the core, said plates being secured to the spindle 22 by an axial cap screw 24. A tire casing 25 of known or preferred construction may be built upon the core 17 in the usual manner, the inner periphery of the tire preferably being spaced somewhat outwardly of the inner periphery of the core 17.

To separate the tire 25 from the core 17, the latter is dismounted from the spindle 22, and the tire and core are locally deformed in the region of one of the reinforcing members 18 so as to position said member obliquely with relation to the normal plane of the core, as is most clearly shown in Figure 7. The inner end of the reinforcing member may then be grasped and the member withdrawn from the core, through the central opening in the tire, as indicated by the broken lines in Figure 7. After all the reinforcing members 18 have been removed in the manner described, the core 17 is removed from the tire by grasping the inner end of strip 15, and withdrawing said strip lengthwise, through the central opening of the tire, while uncoiling the strip. If the tape 20 does not pull away with the trailing end of strip 15, it may thereafter be removed.

The tire may then be vulcanized in the usual manner. The strip 15 is again recoiled, the reinforcing members 18 are inserted in place, the tape 20 is applied to the outer periphery of the core, and the latter again is ready for use. This completes a cycle of operation which is repeated as desired.

The invention facilitates the manufacture of tire casings having relatively small bead diameter as compared to the outside diameter of the tires, and achieves the other advantages set out in the foregoing statement of objects.

Modification may be resorted to without departing from the spirit of the invention or the scope of the appended claims, which are not limited wholly to the specific construction shown or exact procedure described.

What is claimed is:

1. In a tire building core, the combination of an annular structure of flexible rubber composition, and a plurality of spaced apart reinforcing elements of metal removably mounted therein and permitting flexure of the core as a whole in a direction transverse to its normal plane.

2. In a tire building core, the combination of an annular structure of flexible rubber composition, and a plurality of removable, spaced apart, metal strips reinforcing the same from the inner periphery to the outer periphery thereof.

3. In a tire building core, the combination of an annular structure of flexible rubber composition formed with a plurality of apertures extending radially through its structure, and respective reinforcing strips of metal removably mounted in the said apertures.

4. In a tire building core, the combination of an annular resilient rubber structure formed with a plurality of radial apertures extending through its structure in the central plane thereof, and respective metal reinforcing members removably mounted in said apertures and projecting inwardly of the inner periphery of the structure.

5. A tire building core comprising an annular structure of resilient rubber that has a transverse spiral cut therein extending from one periphery thereof to the other.

6. Tire building apparatus comprising an annular tire building core structure of flexible rubber composition formed with a plurality of slots extending radially through its structure, respective reinforcing strips of metal removably mounted in said slots and projecting inwardly of the inner periphery of the structure, and an axial support for the core having driving engagement with the inner ends of said reinforcing strips.

7. A tire building core comprising a single strip of resilient rubber spirally coiled in a plurality of superposed convolutions, and removable metal reinforcing elements disposed radially of the core and extending through the convolutions thereof.

8. A tire building core comprising a strip of resilient rubber spirally coiled in a plurality of superposed convolutions to constitute an annular structure, means for securing the outer end of said strip to the structure, and a plurality of reinforcing elements extending transversely of said convolutions and radially of the core for imparting lateral rigidity to the structure.

9. A tire building core comprising a strip of resilient rubber spirally coiled in a plurality of superposed convolutions to constitute an annulus, there being a plurality of apertures extending radially through said annulus, metal strips removably mounted in said apertures, the inner ends of said strips extending into the central opening in the annulus and the outer ends thereof being spaced inwardly from the outer periphery of the annulus, and means circumscribing the annulus for concealing the apertures therein and for securing the outer end of the strip thereto.

10. The method of making a collapsible annular core which comprises molding and vulcanizing a rubber structure of the shape desired, and then cutting the structure spirally from one periphery to the other.

11. The method of making a collapsible core which comprises molding and vulcanizing an annular rubber structure having removable inserts therein, removing said inserts, cutting the structure spirally from one periphery to the other, and then mounting reinforcing elements in the spaces originally occupied by said inserts.

12. The method of making a collapsible core which comprises molding and vulcanizing an annular rubber structure having radially disposed inserts therein, which inserts project from the inner and outer periphery thereof, removing said inserts, cutting the structure spirally from one periphery to the other, and then inserting metal strips in the spaces originally occupied by said inserts.

13. The method of making a collapsible core which comprises molding and vulcanizing an annular rubber structure, and thereafter cutting the structure spirally from one periphery to the other, the convolutions of the spiral cut being closer together adjacent the inner periphery of the structure.

14. The method which comprises providing an annular core of resilient material including radially disposed reinforcing members interiorly of the core structure, fabricating a tire casing upon the core, successively deforming the tire locally in the regions of the reinforcing members and removing the same through the central opening of the core and tire, and then removing the flexible core through the central opening of the tire.

15. The method which comprises providing an annular core of resilient material having radially disposed slots through its structure and having reinforcing elements mounted in said slots, said reinforcing elements projecting into the central opening of the core, mounting said core upon a rotatable spindle and driving it by means of power transmitted through said reinforcing elements, building a tire casing upon said core, dismounting the core from the spindle, removing the reinforcing members by withdrawing them through the central opening in the core and tire, and then withdrawing the core from the tire through the central opening of the latter.

16. The method which comprises providing an annular core comprising a spirally coiled strip of flexible material arranged in a plurality of superposed convolutions and having radially disposed reinforcing members in radial slots disposed in the central plane of said structure, with the inner ends of said members projecting from the inner periphery of the core, rotating the core about its own axis by power applied primarily through said reinforcing members, building a tire upon the core, locally deforming the tire and core and withdrawing the reinforcing members in succession through the central openings in the core and tire, and then withdrawing the core by uncoiling it through central opening of the tire.

WILLIAM H. MYERS.